US009505026B2

(12) United States Patent
Harries et al.

(10) Patent No.: US 9,505,026 B2
(45) Date of Patent: Nov. 29, 2016

(54) FLEXIBLE PIPE BODY AND METHOD OF PRODUCING SAME

(71) Applicant: Wellstream International Limited, Newcastle-upon-Tyne (GB)

(72) Inventors: Iwan Rhys Harries, Whitley Bay (GB); Neville Dodds, Newcastle-upon-Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 341 days.

(21) Appl. No.: 13/862,276

(22) Filed: Apr. 12, 2013

(65) Prior Publication Data

US 2013/0276930 A1 Oct. 24, 2013

(30) Foreign Application Priority Data

Apr. 19, 2012 (EP) .................................... 12164837
Oct. 25, 2012 (EP) .................................... 12189971

(51) Int. Cl.
*B05D 3/00* (2006.01)
*B29C 71/00* (2006.01)
*B29C 47/00* (2006.01)
*C08J 7/12* (2006.01)
(Continued)

(52) U.S. Cl.
CPC ........... *B05D 3/007* (2013.01); *B29C 47/0023* (2013.01); *B29C 47/021* (2013.01); *B29C 47/061* (2013.01); *B29C 47/065* (2013.01); *B29C 71/0009* (2013.01); *C08J 7/02* (2013.01); *C08J 7/12* (2013.01); *F16L 11/04* (2013.01); *F16L 11/081* (2013.01); *F16L 11/082* (2013.01); *F16L 11/12* (2013.01); *F16L 53/002* (2013.01); *F16L 2011/047* (2013.01)

(58) Field of Classification Search
CPC .......... B29C 71/0009; B29C 47/0023; B29C 47/021; B29C 47/061; B29C 47/065; B05D 3/007; C08J 7/12; F16L 11/081; F16L 2011/047; F16L 11/04; F16L 11/12; F16L 11/082; F16L 53/002
See application file for complete search history.

(56) References Cited

U.S. PATENT DOCUMENTS 2,814,313 A   11/1957   Tate
4,343,672 A    8/1982   Kanao
(Continued)

FOREIGN PATENT DOCUMENTS

AU       672508 B2    10/1996
CN      1277101 A    12/2000
(Continued)

OTHER PUBLICATIONS

Office Action from IP Australia Department of Industry Office, for Australian Patent Application No. 2013205311, dated Jan. 15, 2015, 4 pages.
(Continued)

*Primary Examiner* — Mathieu Vargot
(74) *Attorney, Agent, or Firm* — Klarquist Sparkman, LLP

(57) ABSTRACT

A flexible pipe body and method of producing a flexible pipe body are disclosed. The method includes providing a tubular layer; and directing a chemical reagent towards a surface portion of the tubular layer, wherein the tubular layer comprises an extruded polymer, and wherein the chemical reagent is suitable for changing one or more physical or mechanical property of a proportion of the extruded tubular layer thickness.

9 Claims, 3 Drawing Sheets

(51) Int. Cl.
*F16L 11/08* (2006.01)
*F16L 11/12* (2006.01)
*F16L 53/00* (2006.01)
*B29C 47/02* (2006.01)
*B29C 47/06* (2006.01)
*C08J 7/02* (2006.01)
*F16L 11/04* (2006.01)

(56) References Cited

U.S. PATENT DOCUMENTS

| | | | |
|---|---|---|---|
| 6,241,840 | B1 | 6/2001 | Pratt et al. |
| 6,368,526 | B1* | 4/2002 | Bango, Jr. ............ B29C 71/0009 264/1.33 |
| 6,506,333 | B1 | 1/2003 | Qin et al. |
| 2006/0175062 | A1* | 8/2006 | Benson ................... E21B 17/01 166/335 |
| 2008/0193688 | A1 | 8/2008 | Krah et al. |
| 2008/0283138 | A1 | 11/2008 | Rytter |
| 2009/0169790 | A1 | 7/2009 | Nadeau et al. |
| 2010/0084037 | A1 | 4/2010 | Ericsson et al. |
| 2010/0219555 | A1 | 9/2010 | Mehan |
| 2011/0192485 | A1 | 8/2011 | Graham |

FOREIGN PATENT DOCUMENTS

| | | |
|---|---|---|
| CN | 1439838 A | 9/2003 |
| CN | 102216375 A | 10/2011 |
| CN | 102245953 A | 11/2011 |
| EP | 1027550 A1 | 8/2000 |
| EP | 1232849 A2 | 8/2002 |
| GB | 863105 | 10/1958 |
| GB | 861556 | 9/1959 |
| GB | 861556 A | 2/1961 |
| WO | WO96/34733 | 11/1996 |
| WO | WO96/34733 A1 | 11/1996 |
| WO | WO2009/087348 A1 | 7/2009 |

OTHER PUBLICATIONS

European Patent Office, "Communication—European Search Report" for corresponding European Application No. EP12189971.0-1706, Jun. 24, 2013, 11 pages.

Examination Report from the European Patent Office for corresponding European Application No. EP12189971.0-1706, Jul. 21, 2015, 6 pages.

Jifang, "Mechanical Behavior and Optimum Design of Ocean Flexible Pipes Based on the Laboratory Tests and Numerical Simulations", Chinese Master's Theses Full-text Database Engineering Science and Technology I, 14 pages, Oct. 31, 2009.

Unofficial English translation of Chinese Office Action issued in connection with related CN Application No. 201310139063.0 on Mar. 21, 2016.

Unofficial English translation of Office Action issued in connection with related CN Application No. 201310136395.3 on Apr. 5, 2016.

European Search Report and Opinion issued in connection with related EP Application No. 12164837.2 on May 3, 2016.

European Search Report and Opinion issued in connection with related EP Application No. 16154060.4 on May 18, 2016.

\* cited by examiner

FLEXIBLE PIPE BODY AND METHOD OF PRODUCING SAME

CROSS REFERENCE TO RELATED APPLICATIONS

The present application claims the benefit of and priority to European Application Nos. EP12164837.2, filed on Apr. 19, 2012 and EP12189971.0, filed on Oct. 25, 2012, both of which applications are incorporated herein by reference.

FIELD

The present invention relates to a flexible pipe body and method of producing the same. In particular, but not exclusively, the present invention relates to the use of polymers including thermoplastic materials for forming one or more layer of flexible pipe body, and a method of treatment to enhance the characteristics of the polymer.

BACKGROUND AND SUMMARY

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased.

Flexible pipe may also be used for shallow water applications (for example less than around 500 meters depth) or even for shore (overland) applications.

In flexible pipes there are often used polymer layers, such as PVDF (polyvinylidene fluoride), that may be formed by extrusion. Most polymers will have a certain maximum allowable strain above which the risk of damage to the material is much greater. In flexible pipes where a polymer layer lies adjacent an armour layer (such as a polymer barrier layer adjacent a metallic pressure armour layer), the polymer layer may be subjected to quite severe non-uniform, highly localised strain. This is because the armour layer is usually formed from interlocking wires of certain cross section, and there are certain gaps between adjacent windings. The polymer layer tends to deform and creep into the gaps when under pressure.

For example, it will be understood that a flexible pipe is an assembly of a portion of a pipe body and one or more end fittings in each of which a respective end of the pipe body is terminated. FIG. 1 illustrates how pipe body 100 may be formed from a combination of layered materials that form a pressure-containing conduit. It is to be noted that the layer thicknesses are shown for illustrative purposes only.

As illustrated in FIG. 1, a pipe body may include an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. As is known in the technical field, there are 'smooth bore' operations (i.e. without a carcass) as well as 'rough bore' applications (with a carcass). The carcass layer may be formed from helically wrapped metallic tape having a shaped cross section to allow interlocking of adjacent wrapped tape portions.

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

In addition, and not shown in FIG. 1, there may also be included a wear layer between the carcass layer and internal pressure sheath. The wear (or sacrificial) layer may be a polymer layer (often extruded but sometimes in tape form) intended to provide a smoother surface or bed for the barrier layer to be extruded onto than would be the case over the carcass layer, which may have undulations and gaps between wraps; this smoother wear layer surface may allow the barrier layer to experience higher levels of general strain (extension) as a result of bending and pressure because what local stress concentrations remain are relatively small and insignificant. Without such a wear layer the extruded polymer barrier may exhibit an undulating inner surface with protruding cusps of material that have naturally flowed into gaps in the carcass layer during the extrusion process; these cusps act as stress concentrators when the polymer is strained.

An optional pressure armour layer 103 is a structural layer that increases the resistance of the flexible pipe to internal and external pressure and mechanical crushing loads. The layer also structurally supports the internal pressure sheath, and typically consists of an interlocked construction of wires with a lay angle close to 90°.

The flexible pipe body also includes an optional first tensile armour layer 105 and optional second tensile armour layer 106. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

In accordance with industry regulations, all flexible pipe structures must undergo a factory acceptance test (FAT) prior to sale. This involves pressurising a pipe bore with a fluid such as water at 1.5 times the usual pressure of use. The water is thus a pressurising medium.

The application of internal pressure (i.e. pressure from within the bore) to the pipe produces radial expansion in all layers and this is when a polymer layer undergoes deformation and tends to creep into the gaps of an overlying armour layer. At high pressures (about 8000 psi/55 MPa or more), the resultant strain distribution within the polymer layer can be highly localised at the areas around the gaps, and the polymer material may deform by cavitation rather than plastic flow. This can in turn result in the formation of microcrazing or microcracking on the radially inner surface of the polymer layer. During any subsequent loading (such as the loading experienced during normal use in transporting production fluids) this microcrazing may then extend to form longer/deeper cracks throughout the polymer layer. This increases the risk of failure of the polymer layer and may ultimately lead to loss of pressure containment, having an adverse effect on the lifetime of a flexible pipe.

According to a first aspect of the present invention there is provided a method of producing a flexible pipe body, comprising: providing a tubular layer; and directing a chemical reagent towards a surface portion of the tubular layer, wherein the tubular layer comprises an extruded polymer, and wherein the chemical reagent is suitable for changing one or more physical or mechanical property of a proportion of the extruded tubular layer thickness.

According to a second aspect of the present invention there is provided a flexible pipe body formed by a process comprising: providing a tubular layer; and directing a chemical reagent towards a surface portion of the tubular layer, wherein the tubular layer comprises an extruded polymer, and wherein the chemical reagent is suitable for changing one or more physical or mechanical property of a proportion of the extruded tubular layer thickness.

According to a third aspect of the present invention there is provided a flexible pipe body for transporting oil or gas or other such fluid from a sub-sea location, comprising: a tubular layer comprising a polymer, wherein the tubular layer has a radially inner edge portion or a radially outer edge portion that has an elastic modulus that is lower than the remainder of the tubular layer.

According to a fourth aspect of the present invention there is provided a method substantially as herein described with reference to the drawings.

According to a fifth aspect of the present invention there is provided a flexible pipe body substantially as herein described with reference to the drawings.

Certain embodiments of the invention provide the advantage that a flexible pipe body is provided that has been treated to reduce, inhibit or prevent microcrazing.

Certain embodiments of the invention provide the advantage that a method of treating a flexible pipe body is provided to reduce, inhibit or prevent microcrazing that can be conveniently incorporated into current pipe manufacturing processes.

The foregoing and other objects, features, and advantages of the invention will become more apparent from the following detailed description, which proceeds with reference to the accompanying figures.

BRIEF DESCRIPTION OF THE DRAWINGS

Embodiments of the invention are further described hereinafter with reference to the accompanying drawings, in which.

In the drawings like reference numerals refer to like parts.

DETAILED DESCRIPTION

Figure 3:
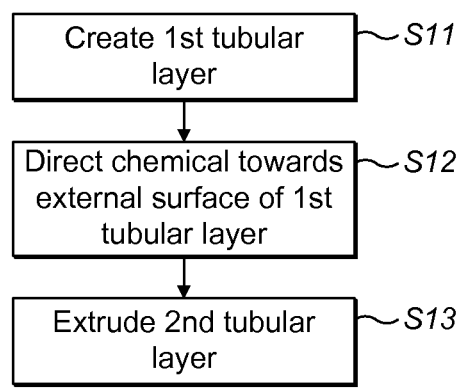
FIG. 3 shows a flow diagram illustrating a method of providing a flexible pipe.
Figure 4:
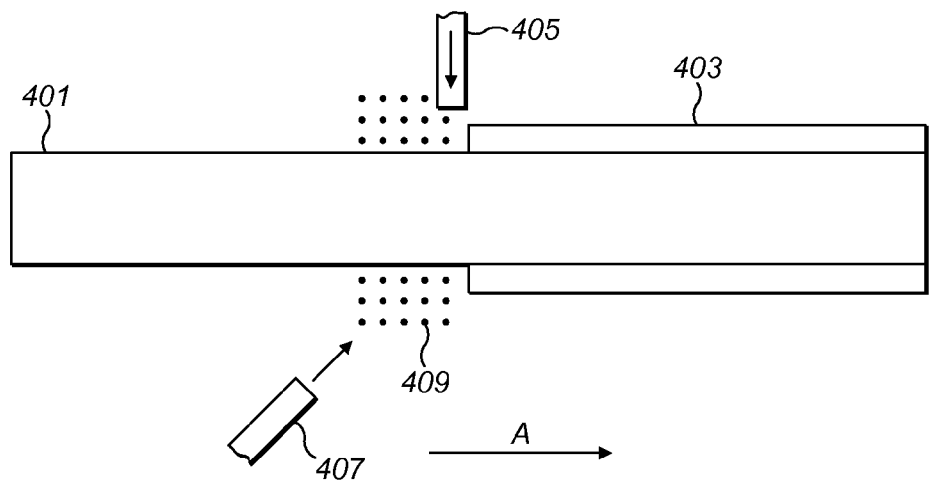
FIG. 4 illustrates a schematic representation of the method of FIG. 3.

FIGS. 3 and 4 illustrate an embodiment of the invention in which a flexible pipe body 400 is manufactured. In a first step S11 a tubular length of polymeric material is provided for forming a polymeric layer 401 of the flexible pipe body. In this example, the polymeric material is PVDF and formed as a wear layer 401 of the pipe body, and is provided by extrusion onto a pre-formed carcass layer (not shown) in a known manner.

In a second step S12, before or whilst a barrier layer 403 is being formed (step S13), a treatment is undertaken whereby the polymeric layers are treated with a chemical. Here, acetone is sprayed from a nozzle 407 located at a position close to the point at which the barrier layer 403 is being applied to the surface of the wear layer 401. A spray or mist or circumferentially fully encompassing liquid flush of acetone 409 is provided over an area of wear layer 401 just prior to super-forming the barrier layer 403, the acetone presenting to, and treating, the adjacent surfaces of both polymer barrier and wear layers 401, 403.

The nozzle 407 may be positioned to direct the spray between the wear layer 401 and barrier layer 403. The spray 409 substantially coats the portion of flexible pipe body on both the radially outer surface of the wear layer and the radially inner surface of the barrier layer. The chemical spray 409 in contact with the polymer layers 401 and 403 is able to react with the layers in order to chemically treat the surface of the polymers at these surfaces.

In a third step S13, a further tubular length of polymeric material 403 is provided. In this example, the polymeric material is also PVDF and formed as a barrier layer 403 of the pipe body. The barrier layer 403 is provided by extrusion onto the wear layer 401 in a known manner.

In this embodiment, the extrusion is performed by directing PVDF in a flowable state towards the wear layer 401 via a nozzle 405 and formed around the wear layer 401 using an extruder head and tip (not shown) to control shape and concentricity of this further tubular barrier layer 403 being formed. At the same time, the formed layers of flexible pipe (including the carcass layer and the wear layer 401) are moved in a horizontal direction indicated by arrow A in the direction of the pipe's longitudinal axis. This allows the flowable material to cover the wear layer and form the further tubular layer 403.

Although the description above refers to the use of acetone, many chemicals may be used so as to change a physical property of the polymeric layer. The chemical may be a hydrocarbon oil or fluid, a polar solvent (such as common alcohols), or non-polar solvents (for example benzene or toluene), or ionic or supercritical liquid solvents. Additional examples of possible chemicals are: Dimethyl Sulfoxide, Methyl Ethyl Ketone, Dibutyl Sebacate (DBS), Xylene, Monoethylene Glycol (MEG), and Ethyl Acetate. The chemical may also be a mixture, suspension or alloy of chemicals in order to provide the active ingredient at the desired location, for instance a gel containing the solvent chemical, or an oil and solvent emulsion, or a mixture of a super-low viscosity silicone oil with the active chemical may also be used. Some of these chemicals or chemical combinations may require activation using heat or pressure in order for them to effectively react with the polymer surface.

Indeed a carrier fluid may contain pockets or bubbles with the active chemical in, these pockets release their contents on either pressurisation between the two polymer layers 401 and 403 or from the temperature of the extrusion, or as a result of the removal of the carrier fluid from around said pockets of active chemical through evaporation, permeation, or reaction with the surface of the pockets.

Additionally the liner or wear layer polymer may be dosed with the active chemical in such a way that the active chemical is released over time. This release will act on the layer extruded over the top and provide the necessary and desired chemical treatment for the inner surface of the barrier layer.

Upon formation of the completed flexible pipe body, this may be immediately or later followed by a FAT.

The treatment of the polymer layers with acetone is used to change one or more property of a surface of the layers. In this case the physical property includes the stiffness or elastic modulus (Young's modulus of elasticity) and yield strength. The chemical acts as a semi-solvent, which has the effect to softening the polymer without dissolving the polymer.

It has been found by the inventors that, surprisingly, by chemically treating a polymer layer, such as a barrier layer of a flexible pipe body, microcrazing in the layer during later pressurisation of the flexible pipe body is reduced or prevented (e.g. during a Factory Acceptance Test or when the pipe body is in use to transport production fluids or inject fluids into a well to maintain the reservoir pressure). That is, as a result of the treatment, the polymer layer should be more resistant to crazing and cracking under pressure from the bore of the pipe. The treatment is applied in a controlled manner so as to only affect a portion at the surface of the layer. This change to the molecular structure of a radially inner surface of the layer is sufficient to prevent microcrazing even though the radially outer portion of the layer (which is the portion that is pushed between gaps in an overlying armour layer) is not treated. It is thought that the chemical treatment increases the elasticity and toughness of the polymer under pressure at the inner surface sufficiently to prevent initiation of microcrazing. The relative softening of the material at the radially inner surface area causes the polymer material to move into any gaps that are present between windings of an overlying armour layer when under pressure. This helps the polymer to flow partially into the gaps without cavitation and under a relatively low stress. Once the polymer has moved the desired amount into the gaps, as a result of the treatment stage, the polymer remains in that position.

Therefore, areas of the polymeric layer, which may have been subject to high localised strain under high pressure (from the FAT or in use) in known pipe arrangements due to the proximity to gaps, are not subject to such high strain in further use. That is, even when the pipe body undergoes high pressure in a FAT or use, the strain levels are not as high as other known arrangements. This has proved to significantly reduce or completely prevent any microcrazing in the polymeric layer during its future use after the treatment stage, including during a FAT and use in transporting production fluids.

The affect upon the polymer by the treatment stage may be permanent or temporary. If the affect is permanent, then the polymer layer (e.g. barrier layer 403) will have the above-mentioned advantages in terms of reduced or zero chance of microcrazing in future use as a flexible pipe. If the affect is temporary, then the resultant polymer layer will have the advantages sufficiently long for the benefits to be seen during the FAT.

It is to be noted that a chemical treatment to a surface portion of a polymer layer such as layer 403 may be seen to weaken the surface properties of the polymer layer (permanently or temporarily). However, this surface portion may be only a very small proportion of the full thickness of the cross-section. For example, a portion of the cross-section of a polymer layer may be only 0.1 mm thick, or 0.5 mm thick, or 1 mm thick, for example. The remaining portion of polymer layer that has not been subject to treatment, for example approximately 6 mm thick, or 8 mm thick, or 10 mm thick, will remain at full strength and sufficient to adequately perform the function of a fluid retaining layer. It will be appreciated that precise thicknesses and materials will depend upon the specific parameters of use and can be determined by one skilled in the art.

Figure 5:
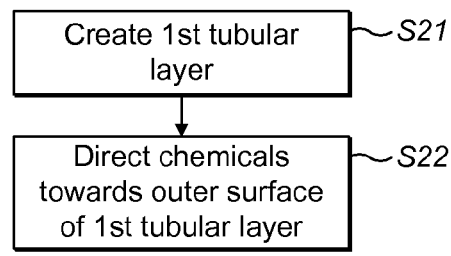
FIG. 5 shows another flow diagram illustrating a method of providing a flexible pipe.

Another embodiment of the present invention is shown in FIG. 5. This is similar in some ways to the first embodiment and therefore for brevity not all details will be repeated.

In step S21 a tubular length of polymeric material is provided for forming a polymeric layer of a flexible pipe body. In this example, the polymeric material is again PVDF and formed as a liner of the pipe body, and is provided by extrusion onto a mandrel (not shown) in a known manner.

In step S22 a treatment stage is undertaken whereby the polymeric layer is treated with a chemical. Here, silicone oil based fluid is sprayed at a location close to the recently formed polymeric layer (although it will be understood that this treatment may be performed at any time after the forming of the layer). The silicone oil has a lower kinematic viscosity than most silicone oils currently used in the industry, for example with a super-low kinematic viscosity of about 50 cSt (50 mm$^2$·s$^{-1}$) or less, or particularly aptly a kinematic viscosity of less than 20 cSt (20 mm$^2$·s$^{-1}$). A spray or mist of the silicone oil based fluid is formed in an area around the portion of liner after being formed. The fluid substantially coats the radially outer surface of the layer and treats the layer accordingly on its outer surface.

Optionally, a further tubular length of polymeric material could be extruded prior to and/or after the tubular polymeric layer of step S21.

With this embodiment the result is a polymer layer for a flexible pipe body that has been treated with a chemical reagent on at least one surface thereof.

Another embodiment of the invention will now be described in which a flexible pipe body is manufactured. In a first step a tubular length of polymeric material is provided for forming a polymeric layer of the flexible pipe body. In this example, the polymeric material is PVDF as a liner of the pipe body, and is provided by extrusion onto a mandrel in a known manner.

In a second step a strength layer, which in this case is a pressure armour layer, is provided over the liner. The pressure armour layer is formed from an elongate strip of carbon steel having a generally Z-shaped cross-sectional profile. The strip is formed from a wire rolling process to have corresponding male and female connector portions such that as the strip is wound over the polymeric layer adjacent windings interlock.

In a third step, a treatment stage is undertaken whereby the polymeric layer is treated with a chemical. More specifically, the radially inner surface of the polymeric layer is soaked with a chemical so as to change at least one physical property of the layer.

An example of the treatment stage will now be described with reference to FIG. 6. A fluid inlet conduit 502 is connected to a first end 506 of flexible pipe body 501 via a pump member 508. The pipe body is conveniently stored on a reel 510 whilst undergoing the treatment stage. Acetone is then pumped through the pipe body. Acetone exiting the second end 514 of the pipe body may re-circulated back to the first end of the pipe body (in direction of arrow B via a conduit 516). This acetone flushing is continued for up to 2 hours.

Subsequent to the treatment stage, the pipe body may then undergo the usual Factory Acceptance Test by pressurising the pipe body to a predetermined pressure, immediately or separately. The pipe body may be cut down into shorter lengths and the separate lengths then subject to a FAT. The polymeric layer may only expand into the gaps of the strength layer at the time of the FAT. However, the chemical treatment to the inner surface is sufficient to reduce strain and therefore microcrazing of the layer.

Figure 6:
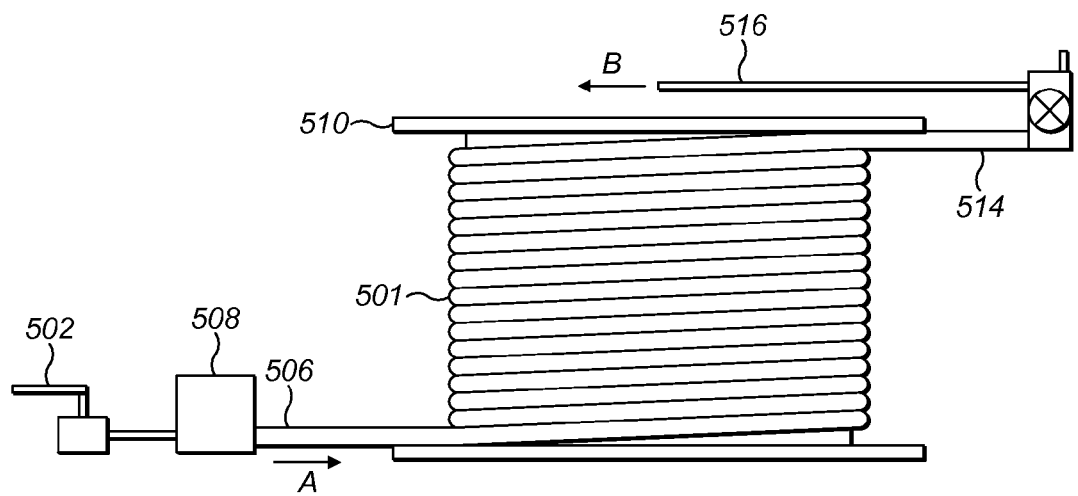
FIG. 6 illustrates a method of providing a flexible pipe.

The method of FIG. 6 effectively provides a treatment stage in which the radially inner surface of the polymeric layer is exposed to acetone for the predetermined time length. The exposure causes a change in the stiffness of a portion of the polymeric layer at the radially inner side, without detrimental degradation of the polymeric layer. The chemical acts as a semi-solvent, which has the effect to softening the polymer without dissolving the polymer.

Various modifications to the detailed designs as described above are possible. For example, the polymeric layer(s) treated may be any layer(s) of the pipe body and not limited to the wear layer, liner or barrier layer. The armour layer may similarly be any layer of the flexible pipe body such as a strength layer, a pressure armour layer, a tensile armour layer, etc. The polymeric layer need not be directly adjacent to an armour layer; there may be intermediate layers such as a sacrificial tape layer. For flexible pipe body with more than one polymeric layer, the method described above may be employed more than once so as to treat each of the polymeric layers in turn or concurrently. The treatment stage may be performed directly onto a barrier layer with a carcass layer present, since a carcass layer is not fluid-tight and will allow the spray or mist to flow therebetween to access the polymeric barrier layer. The treatment chemical may be incorporated into or combined with the polymer granules used in the extrusion process for an extruded layer or an extruded tape to be wound onto the pipe as a wear layer, thereby providing that layer with the means of releasing the active chemicals over time, or as a result of an event (such as the application of heat or pressure) from that layer into adjacent polymer layers.

The materials used for the treatment stage may be chosen according to the particular flexible pipe body materials, design, and future FAT test pressure.

The chemical reagent may be any suitable reagent for changing the physical property of the polymeric layer. The chemical may be a hydrocarbon oil or fluid, a polar solvent (such as common alcohols), or non-polar solvents (for example benzene), or ionic or supercritical liquid solvents such as acetone, toluene, dibutyl sebacate, methyl ethyl ketone, ethyl acetate, dimethyl sulfoxide, xylene, monoethylene glycol, silicon oil having a viscosity of about 50 cSt or less, or a combination thereof, or a dilution in water thereof.

The spray or mist may have any suitable droplet size sufficient to completely or substantially coat the surface of the polymer layer, else a circumferentially fully encompassing liquid flush may be used instead.

The polymeric layer may comprise a fluoropolymer such as PVDF, a polyamide such as PA-12 or PA-11, another material such as polyphenylene sulphide (PPS), PP, PFA, HDPE, PEEK, PEX, or a combination thereof, and may have additional components such as metallic wires or nanoparticles dispersed therein. Tape layer type wear layers could comprise a polymer, such as those listed above, or be of composite construction, bonded or unbounded to the surrounding layers and comprising either a cured or an uncured matrix around metallic or non-metallic reinforcements, or comprise metallic tapes.

The physical property may include stiffness, shape, modulus of elasticity, stress-strain relationship, threshold strain for crazing, surface hardness, surface tension, friction for movement of polymer fibre chains, microstructure of polymer chain distribution, and density, for example. The radially inner surface, or the radially outer surface, or both surfaces may be chemically treated.

With the above-described arrangement a flexible pipe body is provided that has been treated to reduce, inhibit or prevent microcrazing. The method of treating a flexible pipe body can be conveniently incorporated into current pipe manufacturing processes.

As such, the operating parameters of temperature and pressure of flexible pipes will be extended. That is, the pipes will be able to withstand increased operating pressures compared to known arrangements.

The invention may be of particular use for high pressure applications, such as use at 15000 psi (103 MPa) and over.

Figure 1:
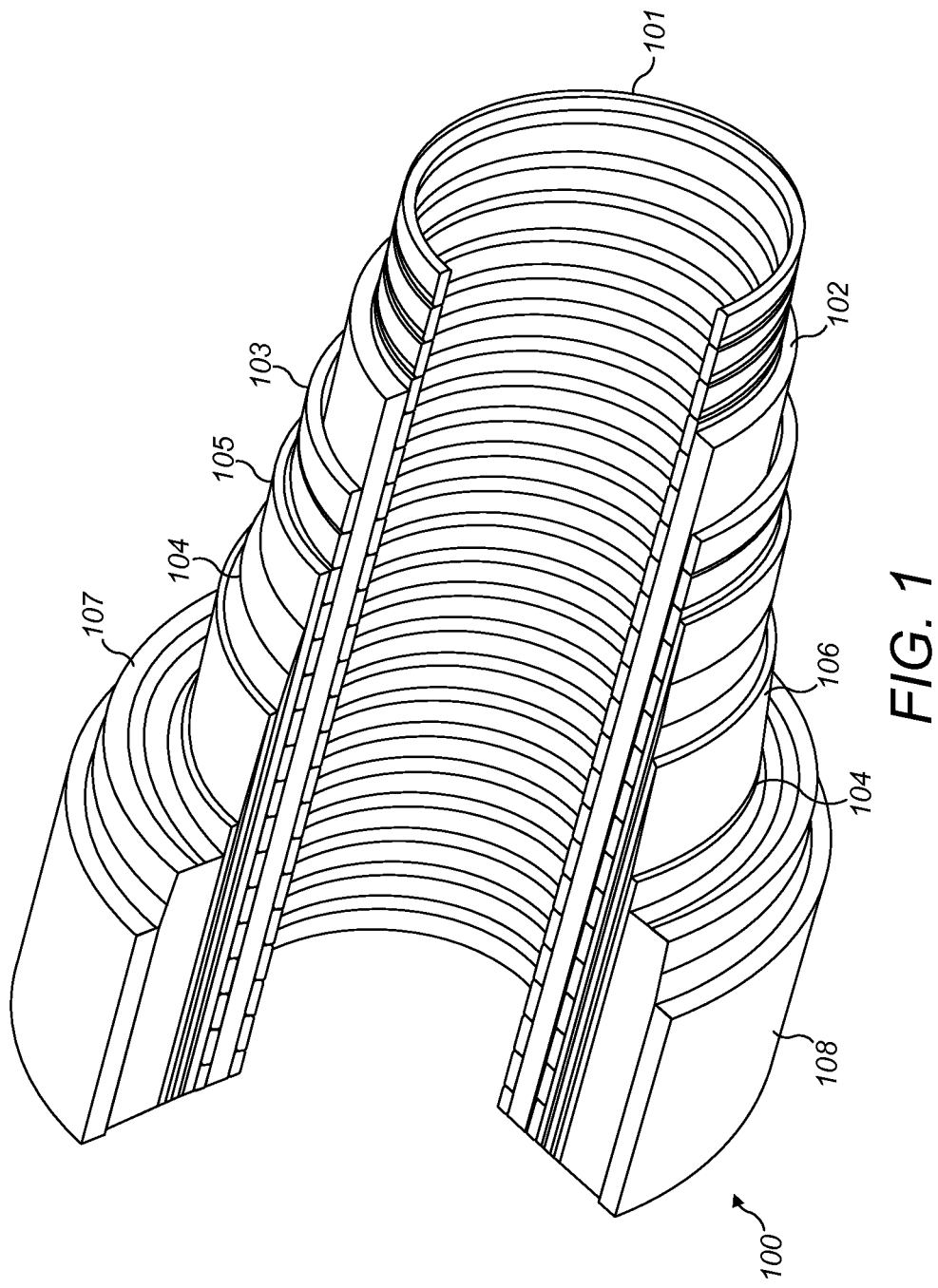
FIG. 1 illustrates a flexible pipe body.
Figure 2:
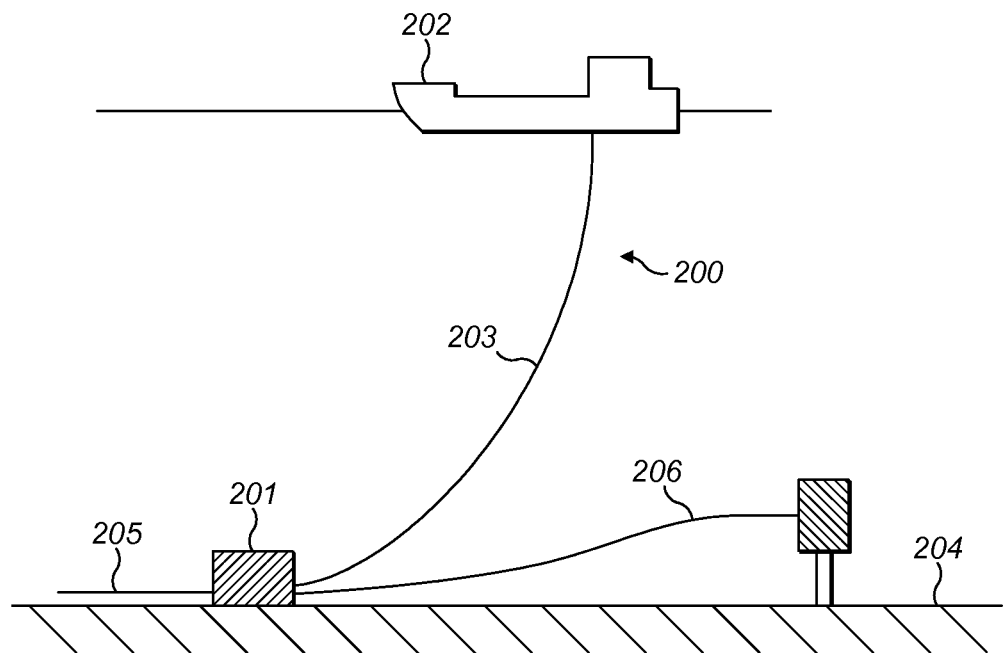
FIG. 2 illustrates a riser assembly.

It is to be understood that the present invention is broadly applicable to coaxial pipe body structures including two or more layers manufactured from a variety of possible materials, for example including some or all of the layers as shown in FIG. 1.

The invention is not necessarily limited to the step orders shown in the flow diagrams.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of producing a flexible pipe body for transporting production fluids from a sub-sea location, comprising:
   providing a tubular layer; and
   directing a chemical reagent towards a surface portion of the tubular layer,
   wherein the tubular layer comprises an extruded polymer comprising a fluoropolymer, a polyamide, polyphenylene sulphide (PPS), PP, PFA, HDPE, PEEK, PEX, or a combination thereof, and wherein the chemical reagent has the effect of softening the polymer without dissolving the polymer and is suitable for changing one or more physical or mechanical property of a proportion of the extruded tubular layer thickness to thereby reduce, inhibit or prevent microcrazing.

2. A method as claimed in claim 1 wherein the tubular layer is a second tubular layer applied by extrusion over a first tubular layer, and the directing step of claim 1 is applied to the first tubular layer prior to the extrusion of the second tubular layer.

3. A method as claimed in claim 1 wherein the tubular layer is a second tubular layer applied by extrusion over a first tubular layer, and the directing step of claim 1 is applied to the second tubular layer after the extrusion of the second tubular layer.

4. A method as claimed in claim 1 wherein the tubular layer is a second tubular layer applied by extrusion over a first tubular layer, and wherein the first tubular layer comprises a polymer doped with the chemical reagent, and wherein the directing step comprises releasing the chemical reagent from the first tubular layer.

5. A method as claimed in claim 1 wherein the polymer comprises PVDF, PA-11, PA-12 or a mixture thereof.

6. A method as claimed in claim 1, wherein the chemical reagent comprises acetone, toluene, dibutyl sebacate, methyl ethyl ketone, ethyl acetate, dimethyl sulfoxide, xylene, monoethylene glycol, silicon oil having a kinematic viscosity of about 50 cSt (50 $mm^2 \cdot s^{-1}$) or less, or a combination thereof, or a dilution in water or otherwise benign fluid of such chemical agent.

7. A method as claimed in claim 1, further comprising changing a physical property of part of the tubular layer, temporarily or permanently, with the chemical reagent.

8. A method as claimed in claim 7 wherein the physical property includes shape, modulus of elasticity, yield strength, stress-strain relationship, threshold strain for crazing, surface hardness, surface tension, friction for movement of polymer fibre chains, microstructure of polymer chain distribution, and density.

9. A method as claimed in claim 1 further comprising providing an armour layer and an outer sheath over the tubular layer.

* * * * *